Figure 1:
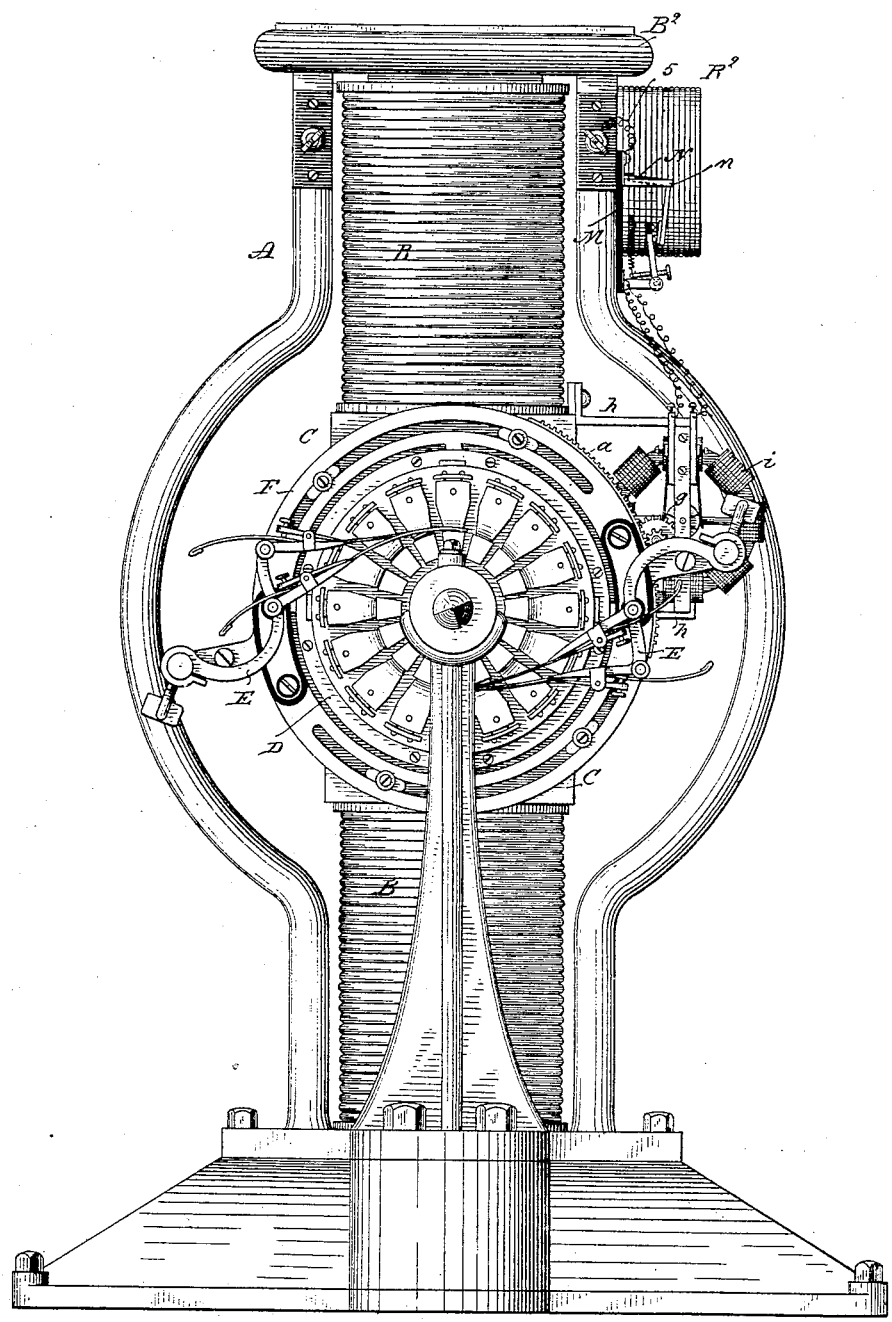

(No Model.) 2 Sheets—Sheet 1.

W. HOCHHAUSEN.
REGULATOR FOR DYNAMO ELECTRIC MACHINES.

No. 294,038. Patented Feb. 26, 1884.

Witnesses:
Ernest Abshagen
Thos. Toomey

Inventor:
Wm. Hochhausen
By his Attorney: H. C. Townsend

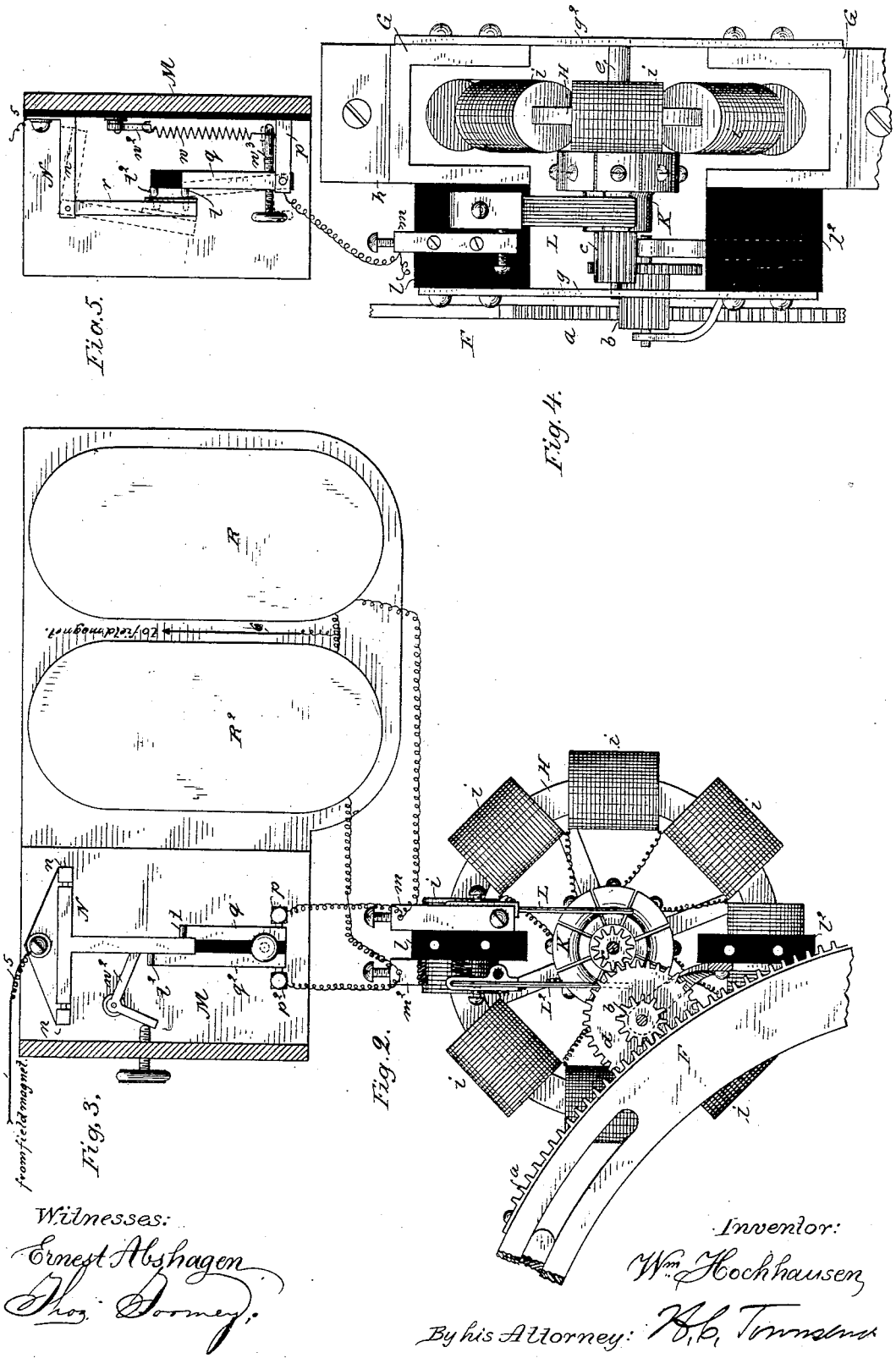

UNITED STATES PATENT OFFICE.

WILLIAM HOCHHAUSEN, OF NEW YORK, N. Y.

REGULATOR FOR DYNAMO-ELECTRIC MACHINES.

SPECIFICATION forming part of Letters Patent No. 294,038, dated February 26, 1884.

Application filed March 16, 1883. (No model.)

*To all whom it may concern:*

Be it known that I, WM. HOCHHAUSEN, a citizen of the United States, and a resident of New York, in the county of New York and State of New York, have invented certain new and useful Improvements in Regulators for Dynamo-Electric Machines, of which the following is a specification.

My invention relates to the regulation of the current supplied by dynamo-electric machines; and it is designed to furnish a practical and efficient device whereby the current upon the circuit supplied by such machine shall be kept constant despite any variations in the resistance of the main circuit. It is well known that the electro-motive force of the current generated by a dynamo-electric machine varies with the position of the commutator-brushes with relation to the neutral line, and it is by taking advantage of this fact and by the employment of certain novel appliances and combinations of devices that I am enabled to automatically regulate the position of the brushes, so that whenever the resistance of the circuit varies the brushes will be automatically shifted forward or backward to the position requisite for supplying to such circuit a current of an electro-motive force adapted to the changed resistance, whereby the volume or strength of current circulating shall be kept uniform although the resistance has changed, the current then being the same whenever a lamp or lamps are removed that it is when all the lamps or other apparatus which the machine is designed to supply are in circuit.

My invention consists in the combination, with a commutator constructed in any ordinary way, so that its brushes may be shifted backward and forward at pleasure, of an electric or other motor geared to the brushes or the support for the same, and a novel arrangement of electro-magnetic controlling devices and circuits, whereby said motor may be made to turn in one direction when the current on the main circuit increases in strength and to turn in the opposite direction when the current diminishes, said devices being so constructed or arranged that when the strength of the field-magnet, and consequently of the current, is normal the motor will remain at rest.

My invention further consists in certain specific combinations of apparatus and improvements in construction that will be recited in the claims.

In the accompanying drawings, Figure 1 is an elevation of a machine, showing my invention applied thereto. Fig. 2 shows the motor enlarged and connected to reversing appliances, Fig. 3. Fig. 4 is a top view of the motor and devices of Fig. 2, and Fig. 5 is a side view of the reversing appliances of Fig. 3.

B B, Fig. 1, indicate the usual field-of-force magnets of a dynamo-electric machine, and A the connecting-frame for said magnets.

At C C are indicated the field-of-force pole-pieces, between whose curved extensions the armature of the machine rotates.

D is the commutator-disk supporting the commutator plates or segments, that are connected in the usual way to the armature-coils. This portion of the machine is here shown as constructed according to my Patent No. 261,712.

At E E are indicated the usual commutator-brush holders, mounted on a frame or support, F, constructed and mounted in any well-known or suitable fashion, so that the commutator-brushes may be adjusted while the armature is rotating either forward in the direction of rotation or backward in a reverse direction.

Formed upon or attached to said frame or support F is a segmental rack, (indicated at $a$,) which is shown more clearly in Figs. 2 and 4 as gearing with a pinion, $b$, fastened to the shaft of a wheel, $d$, which latter gears with a pinion, $c$, on the shaft $e$ of an electric motor, by which arrangement the velocity of movement of the frame F under the action of the motor is greatly reduced, so that the latter may be made very sensitive, and may move at high velocity without danger of over-adjustment.

The motor is constructed and connected as follows:

G G indicate fixed poles of iron, between which the armature of the motor rotates. The poles G G are grooved, as shown, and are attached, by means of brackets $h\ h$, Fig. 1, to the upper and lower poles of the field-magnet of the machine. In Fig. 1 the lower piece is shown displaced upwardly, in order to bring the parts within small compass in the drawing.

H is a ring-armature of the motor, carrying coils of wire $i$, which are connected to one another in endless series, and are provided with connections taken from points between the successive coils to the segments of a commutator, K, after the manner employed in the the Pacinotti or Gramme machine.

L $L^2$ indicate the commutator-brushes of the motor, which are of the usual construction, and are mounted on opposite sides of a block, $l$, of insulating material, which is supported by a pole-piece, G. A second insulating-block, $l^2$, carries brackets, which support the pinion and wheel $b\ d$, while said blocks $l\ l^2$ are united by a brace, $g$, preferably of non-magnetic material, in which and a similar brace, $g^2$, also of non-magnetic material, and uniting the pole-pieces G G, is supported the armature-shaft $e$ of the motor. Connection is made with the electric motor through the conducting-blocks $m\ m^2$, from which the brushes L $L^2$ are respectively supported. The means for reversing the direction of rotation of the motor are in this case electrical, and consist of an arrangement of circuits and circuit-controller whereby the direction of the current through the motor is reversed. The devices whereby this is accomplished are shown in Figs. 1, 3, and 5.

M indicates a block, preferably of insulating material, upon which the parts are supported, and which is attached to the frame of the machine, as shown in Fig. 1, at a point below the upper head of magnet B.

Supported in brackets $n$ is an armature, N, which is free to swing upward in a vertical plane under the influence of the magnetic attraction exerted by the top plate, $B^2$. An arm, $r$, attached to said armature, swings with it and acts as a circuit-closer to complete the circuit between the wire 5, connected to the supports $n$, and one or both of two circuit-closing points $t\ t^2$, which are formed on the ends of conducting-bars $q\ q^2$, connected by an insulating-block, as shown, and forming together a lever pivoted in conducting-supports $p\ p^2$, also insulated from one another, and in electrical connection, respectively, through the bars with the points $t\ t^2$. A spring, $w$, constitutes the retractor for the armature and compound contact-lever $q\ q^2$, one end of said spring being attached to a lever, $w^2$, for adjusting its tension, and the other end to a screw, $w^3$, passing through the compound lever, and adjustable out and in to vary the distance of the end of the spring from the fulcrum of lever $q\ q^2$, and thus vary the action of the spring in its function of retracting the parts.

The circuits and connections are as follows: Contact $t$ is connected, through $q$, $p$, and $m$, with motor-brush L, and contact $t^2$ similarly with brush $L^2$. The brushes L $L^2$ are each connected with a wire, 6, through artificial resistances R $R^2$, respectively, so that the motor is virtually in a bridge between two branch wires, one of which, starting from lever $r$, would include $t$, $q$, $p$, and R, while the other would include $t^2$, $q^2$, $p^2$, and $R^2$. The amount of the resistances R $R^2$ is determined by the resistances of the motor, and is to be sufficient to cause a proper amount of current to be diverted through said motor for operating the same. Wires 5 and 6 are connected in or to the circuits of the machine in any proper way, so that current generated by the same will pass through the circuit-controller and the artificial resistances R $R^2$. In the present case these parts are connected in the circuit between the two field-magnets, as indicated in Fig. 3, wire 5 being connected to the upper and wire 6 to the lower field-magnet.

The operation would be as follows: Normally, or when the machine is generating a current of proper strength and the brushes of the dynamo-machine are in proper circumferential position upon the commutator-cylinder, the armature N will be attracted with sufficient force to hold the circuit-closing arm $r$ in vertical position, or against both contacts $t\ t^2$, so that the current passing through the parts will pass through both branches, including the equal resistances R $R^2$, and no current will pass through the motor, it being in a bridge-wire whose terminals are connected to the branches at points of equal potential. If, however, the resistance in the main circuit of the machine should decrease, thus increasing the volume of current and requiring an adjustment of the commutator-brushes of the dynamo-machine, the armature N will be drawn up, owing to the increased attraction of the field-magnet, thus causing $r$ to rock on the compound contact-lever, and breaking the circuit through $t^2$, while retaining that through $t$. The current will then pass to point $m$, where it will divide, a portion passing the resistances R to 6, another portion being diverted through L, the motor $L^2$, and resistance $R^2$, to 6, thus causing the motor to revolve in a proper direction to move the commutator-brushes of the machine forward to such an extent that the current generated resumes its normal strength, and the armature N will resume its normal position, so that both contacts $t\ t^2$ will be closed and the motor will come to rest, the current ceasing to flow through the same. The amount of current diverted through the motor in this instance will of course depend upon the resistance of R. If R and $R^2$ be made each equal in resistance to the motor, one-third of the current would go through the motor, the resistance of the motor and $R^2$ being twice that of R. If, now, the resistance on the main circuit should increase, thus weakening the magnetism by which N is held up against the stress of spring $w$, and require a backward movement of the brush-holders and support F, the upper end of the compound circuit-closer would be drawn outward by the spring $w$, causing $r$ to rock on the same and to break contact with $t$, while preserving contact with $t^2$. The current will then flow to $m^2$, instead of $m$, as in the second case, and will at that point divide, a portion passing through the motor (but in a reverse direction) to L, resistance R, and 6, and another portion through $R^2$ to 6. The motor will thus be caused to rotate in an opposite direction, and to move the support F and the brushes of the dynamo backward until the current resumes its normal strength, and the armature is attracted with the normal force required to hold $r$ in contact with both $t$ and $t^2$, at which point the adjustment will cease, because the motor will come to rest.

Any proper form of artificial resistance may be used, and any desired construction of electric motor and intermediate gearing between said motor and the brush-support F may be employed. I do not limit myself in these respects, nor as to the means of reversing the direction of rotation of the motor, for which many other devices might be employed, and operated or controlled by the armature N, the latter being under the attraction of some magnet energized or controlled, directly or indirectly, by the current generated by the dynamo-machine.

It is obvious that an independent magnet might be used for said armature in place of the field-magnet of the machine.

What I claim as my invention is—

1. The combination, with the adjustable commutator on a dynamo-electric machine, of a rotary motor geared thereto, and means for reversing said motor, controlled by an armature that is supported by the field-magnet and arranged to be actuated by the magnetic attraction thereof.

2. The combination, with the adjustable commutator, of the rotary motor placed in a bridge between two branches, each containing a resistance, and means for admitting the current to one or the other terminal of the motor, or to both simultaneously, as and for the purpose described.

3. The combination of the adjustable commutator, the rotary motor geared thereto, the bibranched circuit, each branch containing an artificial resistance, the motor-terminals connected to the two branches, and a circuit-closer for admitting the current to one or the other of the branches, as described.

4. The combination, with the electric motor, of the rocking lever carrying two insulated contacts, one connected to one and the other to the other terminal of the motor, and a rocking circuit-closer working upon said lever in the manner described, so as to close one or the other circuit, or both simultaneously.

5. The combination of the circuit-closing lever $r$, the double contact-lever $q\ q^2$, whose contacts are insulated from one another and arranged one above the other, and the electric motor and artificial resistance, connected as described.

6. The combination, with the commutator-brush support F, of the rack $a$, the electric motor, and the gear $b\ d\ c$.

7. The combination, with the rotary motor and the adjustable commutator, of reversing devices for said motor, and an armature for actuating said circuit-reversing devices, supported on the field-magnet frame and arranged to be actuated by the magnetic attraction of said frame.

8. The combination, with the adjustable commutator, of the rotary actuating electromotor, the pole-pieces G G for said motor, connected to the pole-pieces of the machine, and the non-magnetic connecting-pieces $g\ g^2$, in which the motor-shaft is pivoted.

9. The combination of armature M, circuit-closer $r$, double insulated contacts $t\ t^2$, each connected with the continuation of the circuit through a separate branch containing an artificial resistance, and an electric motor in a bridge between said branches at a point between the resistances and the circuit-closer.

10. The combination of circuit-closer $r$, armature N, compound contact-lever $q\ q^2$, contacts $t\ t^2$, resistances R $R^2$, and electric motor, connected as described.

11. The combination, with the adjustable commutator on a dynamo-machine, of an actuating electric motor whose pole-pieces are magnetized from the field-magnets of said machine.

Signed at New York, in the county of New York and State of New York, this 15th day of March, A. D. 1883.

WILLIAM HOCHHAUSEN.

Witnesses:
 WM. H. BLAIN,
 THOS. TOOMEY.

It is hereby certified that Letters Patent No. 294,038, granted February 26, 1884, upon the application of William Hochhausen, of New York, New York, for an improvement in "Regulators for Dynamo-Electric Machines," should have contained the following clause, setting forth certain foreign patents which had been obtained by the said William Hochhausen, viz: "Subject to the limitation prescribed by section 4887 of the Revised Statutes, by reason of English patent No. 2,058, dated April 23, 1883; French patent No. 155,988, dated June 12, 1883; and Canadian patent No. 17,408, dated July 26, 1883."

It is further certified that the United States Letters Patent No. 294,038 should be read with this clause inserted in the grant thereof, thereby limiting its term, and to make it conform to the files and records pertaining to the case in the Patent Office.

Signed, countersigned, and sealed this 25th day of March, A. D. 1884.

[SEAL.]

M. L. JOSLYN,
*Acting Secretary of the Interior.*

Countersigned:
   BENJ. BUTTERWORTH,
      *Commissioner of Patents.*